(12) United States Patent
McDaniel et al.

(10) Patent No.: US 12,478,306 B2
(45) Date of Patent: Nov. 25, 2025

(54) PORTABLE ISOMETRIC NECK ASSESSMENT SYSTEM AND METHOD

(71) Applicant: University of North Carolina at Wilmington, Wilmington, NC (US)

(72) Inventors: Alexander T. McDaniel, Wilmington, NC (US); Lindsey H. Schroeder, Wilmington, NC (US)

(73) Assignee: The University of North Carolina at Wilmington, Wilmington, NC (US)

( * ) Notice: Subject to any disclaimer, the term of this patent is extended or adjusted under 35 U.S.C. 154(b) by 911 days.

(21) Appl. No.: 17/511,216

(22) Filed: Oct. 26, 2021

(65) Prior Publication Data

US 2022/0125362 A1 Apr. 28, 2022

Related U.S. Application Data

(60) Provisional application No. 63/105,623, filed on Oct. 26, 2020.

(51) Int. Cl.
*A61B 5/22* (2006.01)
*A61B 5/00* (2006.01)

(52) U.S. Cl.
CPC ............ *A61B 5/224* (2013.01); *A61B 5/0002* (2013.01); *A61B 5/6803* (2013.01); *A61B 5/7275* (2013.01)

(58) Field of Classification Search
CPC ..... A61B 5/224; A61B 5/0002; A61B 5/6803; A61B 5/7275; A61B 2562/0252; A61B 2562/0261; A61B 5/1124; A61B 5/4519; A61B 2090/064; A61B 5/22; A61B 5/6801–6803; A61B 5/6814;

(Continued)

(56) References Cited

U.S. PATENT DOCUMENTS 9,233,275 B2 1/2016 Gatherer
2007/0272010 A1* 11/2007 O'Leary ............. A63B 23/025
73/379.01

(Continued)

FOREIGN PATENT DOCUMENTS

DE 102015002930 A1 9/2016
WO WO-2004107976 A1 * 12/2004 ............. A61B 5/224

OTHER PUBLICATIONS

Keller, Julie Riedel. "A Normative Data Study of Isometric Neck Strength in Healthy, Adult, Males Ages 18-35." Published Jul. 16, 1990.

(Continued)

*Primary Examiner* — Tse W Chen
*Assistant Examiner* — Evelyn Grace Park
(74) *Attorney, Agent, or Firm* — E. Eric Mills; Nicholas P. Stadnyk; Maynard Nexsen PC

(57) ABSTRACT

A portable isometric neck assessment system and method is provided, comprising an isometric neck strength device comprising a measurement component, an anchor line for connecting the isometric neck strength device to a stationary object, and a tension line for connecting the isometric neck strength device to a head strap. Based on an isometric neck movement of a user, the system can generate and record a strength measurement associated with the isometric neck movement of the user, and further wirelessly transmit the strength measurement to an application or storage system.

20 Claims, 5 Drawing Sheets

(58) Field of Classification Search
CPC ............ A63B 21/00047; A63B 21/002; A63B 21/0023; A63B 21/16; A63B 21/1609
See application file for complete search history.

(56) References Cited

U.S. PATENT DOCUMENTS

2020/0345277 A1* 11/2020 Ledet ..................... A61B 5/224
2022/0079488 A1* 3/2022 Furtado ................. A61B 5/224

OTHER PUBLICATIONS

"Neck Strength and Concussions, Assisted Vs Resisted Training." Published 2014.
Geary, Kevin et al. "Intrarater Reliability of Neck Strength Measurement of Rugby Union Players Using a Handheld Dynamometer." Published Jul. 10, 2013.

* cited by examiner

PORTABLE ISOMETRIC NECK ASSESSMENT SYSTEM AND METHOD

RELATED APPLICATION DATA

This application claims priority under 35 U.S.C. § 119(e) to U.S. Provisional Patent Application No. 63/105,623 filed Oct. 26, 2020, the entirety of which is incorporated by reference herein.

FIELD

The technology described herein generally relates to systems, devices, and methods for assessing neck strength, and more specifically to portable isometric neck strength measurement and assessment systems, devices, and methods.

BACKGROUND

Mild traumatic brain injury (mTBI) is a common injury which calls for accurate diagnosis as it may have clinical consequences that can become more problematic for a patient without proper interventions and therapies. Evaluation and rehabilitation for mTBI's can, in part, rely on neck strength assessment protocols.

TBI's can result from multiple situations, including falls, motor vehicle crashes, sports injuries, and assaults. Recently, there has been increasing interest in exploring the association between neck strength and the risks of mTBI's to develop strength-based prevention protocols. Evidence suggests that increased neck strength can lead to decreased head acceleration, decreased head displacement, and decreased rapid velocity changes following a collision, which when taken together may decrease the risk of severity of mTBI's. It has further been seen that those who sustain mTBI show a decrease in overall neck strength.

Currently, conventional fixed-frame dynamometry provides a reliable method and "standard" for assessing neck strength, however, it may be impractical for use in many clinical settings due to its high-expense and non-transportable nature. For example, fixed-frame dynamometry devices have multiple limitations as they are generally large wall or frame mounted machines with a fixed base. Further, known protocols that use portable hand-held systems lack standardization and reliable implementation, and as such, while portable they do not produce reliable and consistent data. Additionally, conventional neck assessment products lack features which enable robust portability and compatibility or usage with other clinical devices and applications.

Accordingly, the technology described herein can overcome issues in conventional devices, systems, and methods of neck and/or neck strength assessments and enhance the quality of care delivered to patients and enable clinicians to deliver more robust assessments, rehabilitation, and risk mitigation procedures through portable and inexpensive devices and systems.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein are directed towards reliable and portable isometric neck strength assessment system, devices, and methods that can achieve a high confidence interval with respect to isometric neck strength assessments, and additionally be used in conjunction with one or more health risk assessment protocols.

According to some embodiments, a portable isometric neck assessment system comprises an isometric neck strength device, where the device may include a strength measurement component, for example a tension measurement or strain gauge component. The portable isometric neck assessment system can further include an anchor line for connecting the isometric neck strength device to a stationary object, and a tension line for connecting the isometric neck strength device to a head strap worn by a user. Based on an isometric neck movement of a user wearing the head strap in communication with the other components, the system can generate and record a strength measurement associated with the isometric neck movement of the user, and further wirelessly transmit the strength measurement to an application or storage system.

According to some further embodiments methods of implementing a portable isometric neck assessment system comprise receiving an input corresponding to an isometric neck movement of a user by an isometric neck strength device, wherein the movement causes tension in the portable isometric neck assessment system. A tension measurement can then be generated in response to the input. Subsequently, the tension measurement can be transmitted. For example, it can be wirelessly transmitted to an external application, computing system, or storage system.

Additional objects, advantages, and novel features of the invention will be set forth in part in the description which follows, and in part will become apparent to those skilled in the art upon examination of the following, or can be learned by practice of the technology.

BRIEF DESCRIPTION OF THE DRAWINGS

Figure 1:
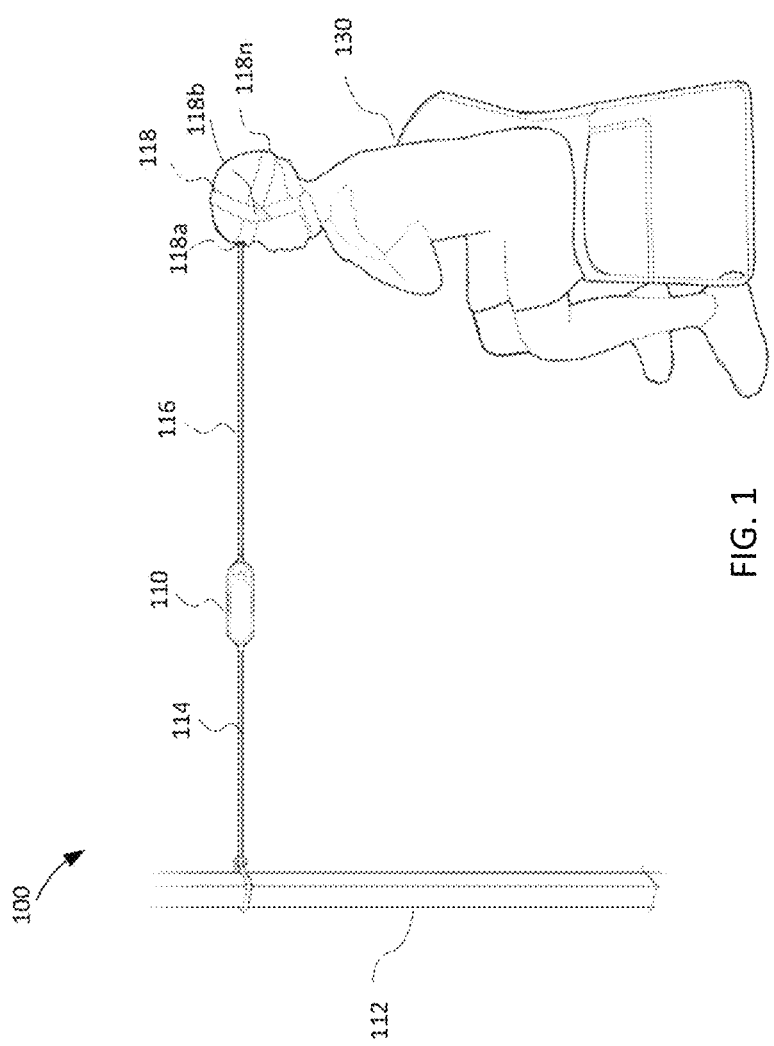
Figure 2:
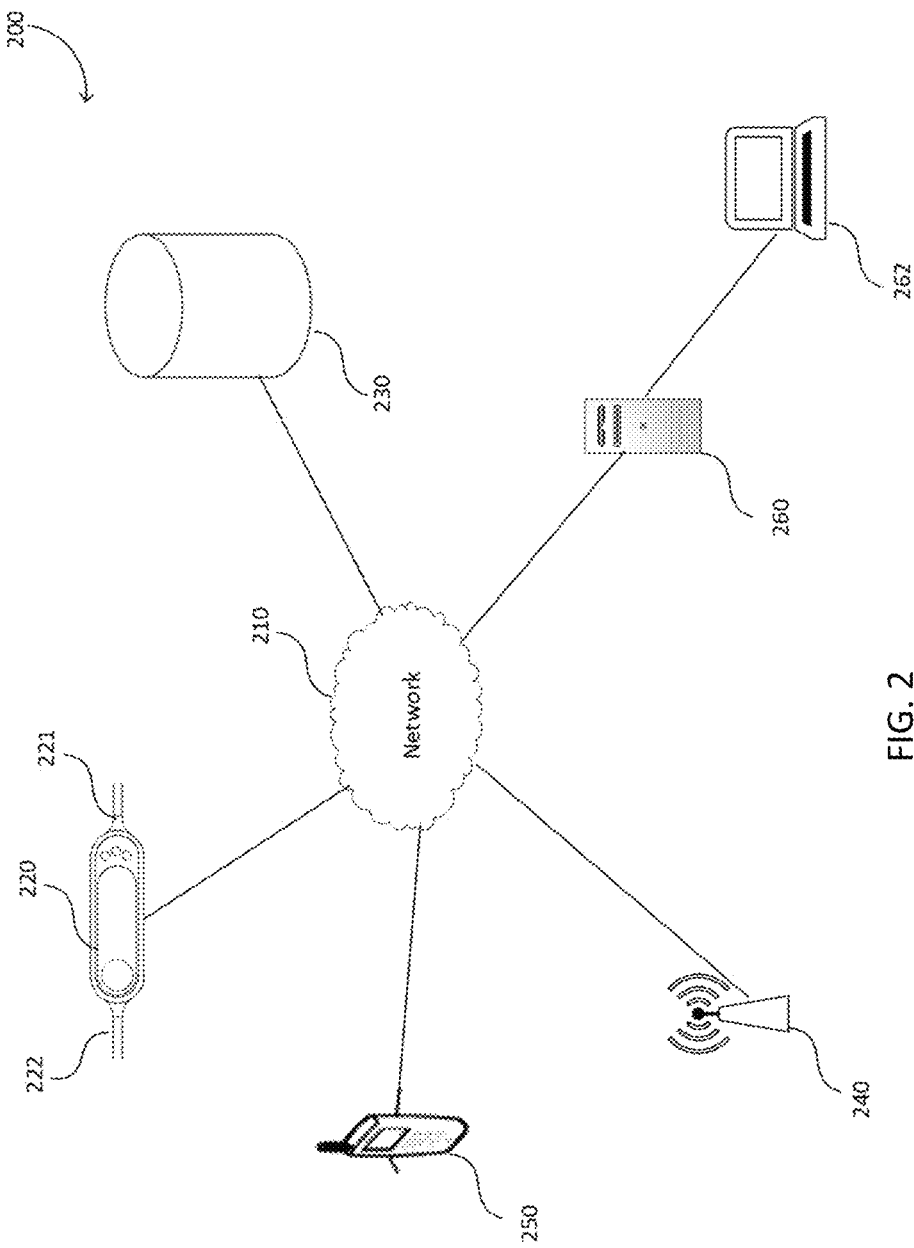
Figure 3:
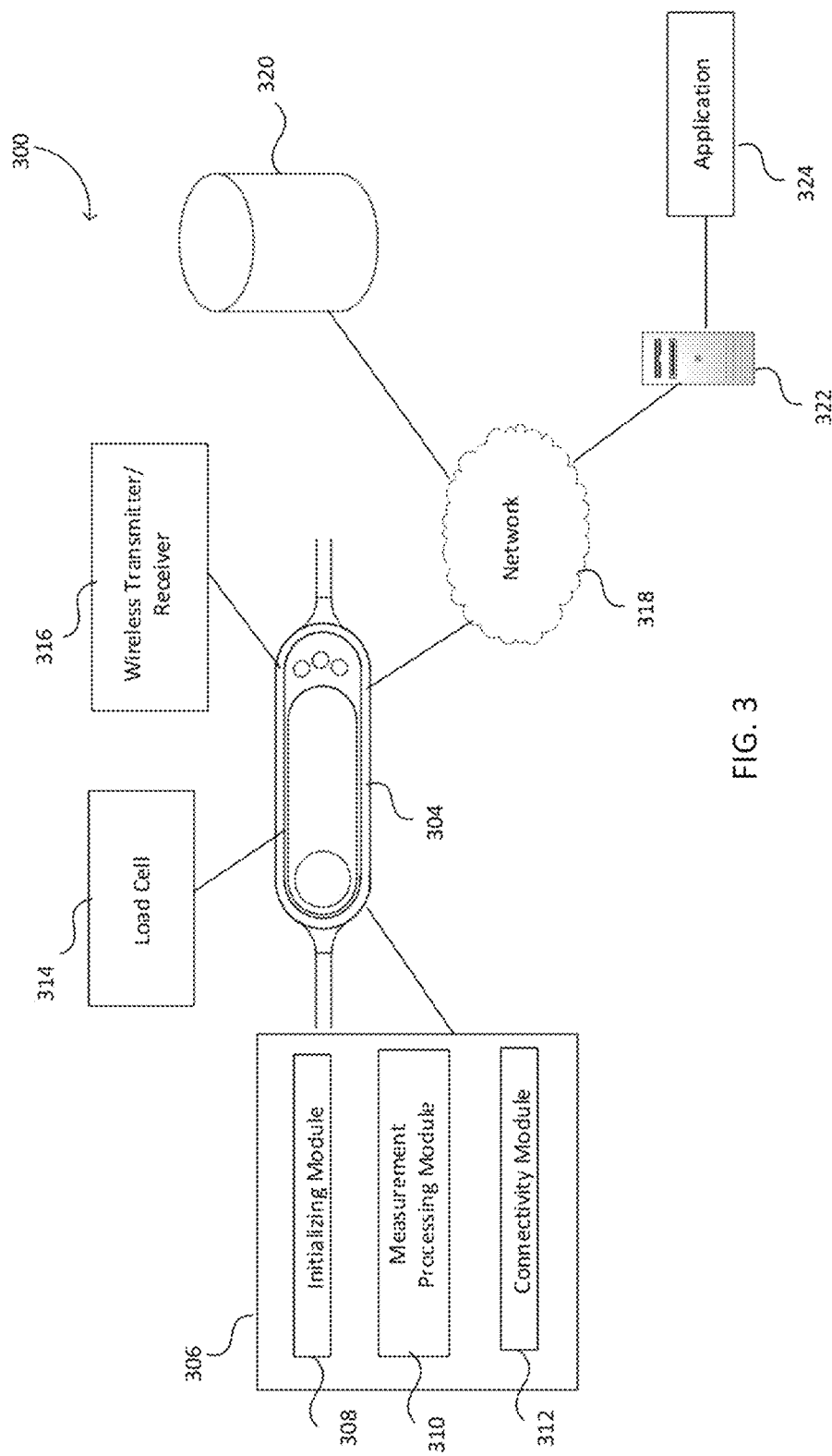
Figure 4:
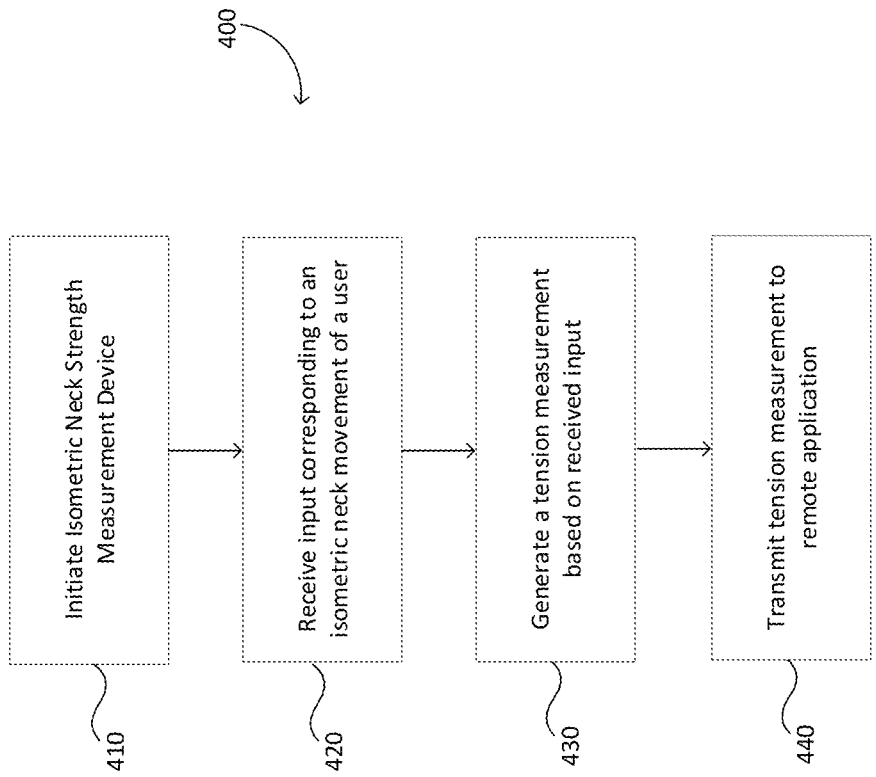
Figure 5:
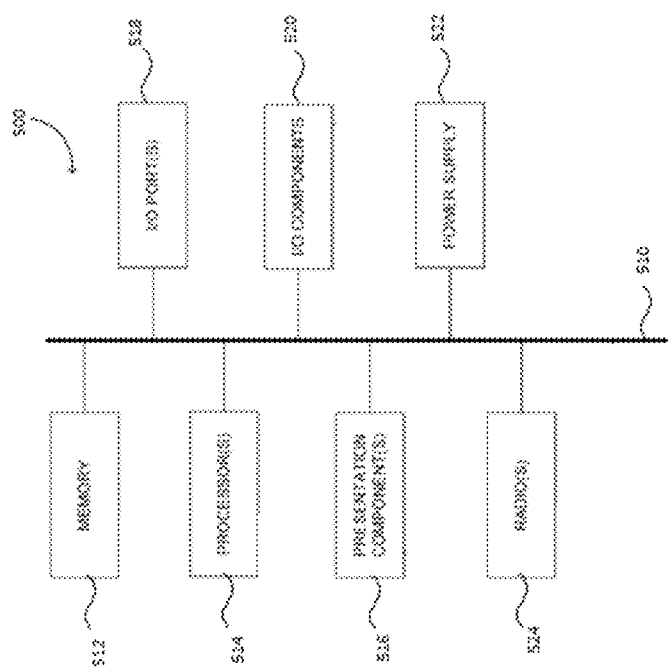

Having thus described the presently disclosed subject matter in general terms, aspects of the technology presented herein are described in detail below with reference to the accompanying drawing figures, which are not necessarily drawn to scale, wherein:

FIG. 1 illustrates a block diagram of an example portable isometric neck assessment system in accordance with some aspects of the technology described herein;

FIG. 2 illustrates a schematic diagram of an example operating environment for an isometric neck assessment system, in accordance with some implementations of the technology described herein;

FIG. 3 illustrates a schematic diagram of an example isometric neck assessment system, in accordance with some implementations of the technology described herein;

FIG. 4 is a flow diagram showing a method for implementing a portable isometric assessment system, in accordance with some aspects of the technology described herein;

FIG. 5 is a block diagram of an example computing environment and/or device architecture in which some implementations of the present technology may be employed.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps disclosed herein unless and except when the order of individual steps is explicitly described.

Accordingly, embodiments described herein can be understood more readily by reference to the following detailed description, examples, and figures. Elements, apparatus, and methods described herein, however, are not limited to the specific embodiments presented in the detailed description, examples, and figures. It should be recognized that the exemplary embodiments herein are merely illustrative of the principles of the invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7. All ranges disclosed herein are also to be considered to include the end points of the range, unless expressly stated otherwise. For example, a range of "between 5 and 10" or "5 to 10" or "5-10" should generally be considered to include the end points 5 and 10. Further, when the phrase "up to" is used in connection with an amount or quantity; it is to be understood that the amount is at least a detectable amount or quantity. For example, a material present in an amount "up to" a specified amount can be present from a detectable amount and up to and including the specified amount.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

According to embodiments of the technology described herein, isometric neck strength assessment systems, devices, and methods are provided, for example for use in conjunction with patient rehabilitation, mild traumatic brain injury (mTBI) prevention and risk mitigation, outcomes, and neck strengthening protocols. Isometric neck strength devices as described herein may be implemented, for instance, as assessment or pre-assessment tools in a rehabilitation setting and/or strengthening or performance enhancement setting, or prior to more invasive interventions. In some embodiments, isometric neck strength assessment devices can be mobile, easy to operate, for instance in providing assessments, and inexpensive.

Accordingly, systems, devices, and methods are provided for measuring isometric neck strength, for instance by a portable isometric neck strength assessment device. Systems and devices described herein are inexpensive and further have been demonstrated to be over 90% effective as conventional standard neck assessment tools in four planes of motion. As such, the technology described herein provides isometric neck strength measurement devices and assessment systems that are integrated units, which are portable and incorporate wireless features and are mobile application capable, and maintain high levels of reliability and validity in providing a user with neck strength assessment results and metrics.

According to some embodiments, an isometric neck strength assessment device and/or system is provided, for example as an assessment tool to measure isometric neck strength. Isometric neck strength can be measured in the following movements by a user: cervical flexion, cervical extension, capital flexion, capital extension, left lateral flexion, right lateral flexion, left cervical rotation, and right cervical rotation. In some instances, isometric neck strength can be measured in one or more, or all of the forgoing movements, and in some other instances, isometric neck strength can be measured by a subset of the forgoing movements. For example, in some embodiments, isometric neck strength can be measured using a subset of capital flexion, cervical extension, left cervical lateral flexion, and right cervical lateral flexion.

According to some further embodiments, an isometric neck strength assessment device or system includes an isometric neck strength measurement device, which in some instances can incorporate a strain gauge and/or tension scale which can measure and/or providing output readings of neck strength based on neck movements of a user. An isometric neck strength measurement device can be connected to an anchor line, which can be affixed to a stationary object and can further be connected to a tension line, which can be affixed to a head harness worn by a user while performing a given neck movement. Based on a user performing a neck movement, a measure of neck strength may be taken, for instance by the isometric neck strength measurement device, and transmitted or otherwise communicated as data to a remote computing device or application running on a computing device.

FIG. 1 depicts a block diagram of an example portable isometric neck assessment system 100 in accordance with various embodiments of the present technology. Isometric neck assessment system 100 can include an isometric neck strength measurement device 110, an anchor line 114, a tension line 116 and a headgear apparatus 118. It will be appreciated that in some instances, isometric neck assessment device may refer to a combination or sub-combination of any of these components in addition to other components described herein. The isometric neck strength measurement device can incorporate a tension scale, strain gauge, one or more load cells, and/or another suitable transducer configured to convert, for example, energy, force, torque, and/or motion produced by a user into one or more electrical signals which can then be used by one or more control systems, for instance. One side of the isometric neck strength measurement device 110 can be anchored to a stationary object 112 via an anchor line 114. Anchor line 114 can be made of any material suitable for use in isometric neck assessment system 100, for instance for performing an isometric neck assessment, such as a cable material, nylon based material, or a combination thereof. The other side of the isometric neck strength measurement device 110 can be connected, anchored, or otherwise attached to a head harness/strap 118 worn by a user 130 via a tension line 116. It will be appreciated that with respect to FIG. 1, user 130 is the subject of the isometric neck assessment. Anchor line 114 and tension line 116 can be integrated with and/or otherwise attached to isometric neck assessment device 110 such that an isometric action by user 130 (e.g. muscle contraction) will cause isometric neck strength measurement device 110 to produce or otherwise generate a reading or measurement corresponding to one or more isometric neck assessment tests and/or neck strength tests. In some embodiments, isometric neck strength measurement device 110 is capable of measuring up to, for example, about 30 pounds of force. Further, isometric neck strength measurement device 110 may include a plurality of mechanisms for connecting anchor line 114 and tension line 116, such as shackles, S-hooks, D-rings, or other suitable connection mechanisms. In some other embodiments, anchor line 114 and tension line 116 are integrated (e.g. directly integrated) with a housing body of isometric neck strength measurement device 110, and are connected (either physically or operably) with a strain gauge/tension scale, or other transducer of the isometric neck strength measurement device 110. Additionally, tension line 116 may be similarly attached to or otherwise integrated with headgear 118. Anchor line 114 can similarly be attached and/or otherwise affixed to a stationary object 112, or in some examples be formed into a loop and secured to the stationary object 112. Head harness/strap 118 can additionally comprise multiple connection points 118a, 118b, 118n which enable different isometric neck strength measurements to be taken. For instance, tension line 116 can be connected to or otherwise attached to a front portion, side portion, or back portion of head harness strap 118.

It will be appreciated that the positioning and/or configuration of the head harness/strap 118 on the user 130 and/or the user 130 with respect to the isometric neck strength measurement device 110 may vary based on a specific isometric neck assessment or strength test. For instance, in one example embodiment, a portable isometric neck assessment system 100 can be configured such that user 130 is standing and isometric neck strength measurement device 110 is arranged off the side of the user 130's head harness/strap 118. In another example embodiment, portable isometric neck assessment system 100 can be configured such that user 130 is sitting and isometric neck strength measurement device 110 is arranged off the front of the user 130's head harness/strap 118.

FIG. 2 depicts aspects of an operating environment 200 for an isometric neck assessment system in accordance with various embodiments of the present disclosure. Operating environment 200 can include, among other components, an isometric neck assessment device 220, a data repository 230, which can be employed on the isometric neck strength measurement device 220 or remotely, an access point 240, a user device 250, and one or more servers 260. These and other components can be configured to be in operable communication with one another via network(s) 210. The isometric neck strength measurement device 220 can include or be in communication with any computing device, more particularly any portable computing device configured to be implemented in an isometric neck assessment system and/or method. The isometric neck strength measurement device 220 can include one or more display components, for example, a display that can present information through visual, auditory, and/or other tactile cues (e.g., a display, a screen, a lamp, a light-emitting diode (LED), a graphical user interface (GUI), and the like. The display component(s) can, for example, present one or more status indicators associated with the isometric neck strength measurement device 220, or present one or more data sets associated with an isometric neck assessment system and/or method. In some embodiments, the isometric neck assessment device 220 can have a connection component 221 and/or connection component 222 which can receive and or connect one or more anchor and tensions lines (e.g. 114, 116 of FIG. 1). In some other embodiments, isometric neck strength measurement device 220 can have a first attachment component 221 and a second attachment component 222, where each attachment component is in operable communication with one or more other components and/or integrated with circuitry and/or software of the isometric neck strength measurement device 220, for example a strain gauge, tension scale, or other transducer for measuring neck strength. The network 210 can be further connected, via the network, to one or more local or remote servers 260 or computing systems 262, for example portable computing systems such as a tablet or smartphone.

FIG. 3 depicts aspects of an isometric neck assessment system 300 used in conjunction with an isometric neck strength measurement device (e.g. 220 of FIG. 2) in accordance with various embodiments of the present technology. The isometric neck assessment system 300 can include a plurality of engines, modules, and/or components that can make up a device operation stack 306 of an isometric neck assessment device 304, which can include, but is not limited to: an initialization module 308, a measurement processing module 310, and connectivity module 312. Among other components not shown, isometric neck strength measurement device 304 (also referred to herein as isometric neck assessment device) can include a user interface and/or user input components for device operation and associated engines and/or modules for their connectivity and operation. As depicted, isometric neck assessment system 300 comprises a content repository 320, which can be a plurality of repositories, which can be in operable communication with isometric neck strength measurement device 304 and any associated engines or modules. Content repository 320 can be a local or remote storage device that can contain or host data associated with one or more isometric neck strength assessments and/or with one or more users, for example a user profile. The various components of system 300 can be connected by a network 318.

The initialization module 308 is generally responsible for facilitating communication between one or more sensors (e.g. load cell 314), transmitters (e.g. wireless transmitter/receiver 316), storage, device input/output and their respective subcomponents. The initialization module 308 can initialize (or reinitialize) the isometric neck strength measurement device 304, which in some instances may include calibration and/or recalibration, in response to receiving a signal from an I/O system of the device. For example, a physical input element (such as a button, switch, or the like) can be depressed or a remote control mechanism can be utilized signaling the isometric neck assessment device and connected components should start running.

Measurement processing module 310 is generally responsible for receiving one or more signals from load cell 314 (or some other digital tension/strain measurement device), associated with an isometric neck contraction input generated or otherwise provided by a user. Measurement processing module 310 can run in conjunction with load cell 314 to convert a physical input associated with an isometric neck contraction of a user to a digital signal. Connectivity module 312 can run in conjunction with one or more wired and/or wireless transmission protocols, for instance with wireless transmitter 316 to transmit collected data and/or measurements associated with an isometric neck assessment (e.g. digital signals) to a repository 320 and/or an external user device (e.g. smartphone, tablet, etc.) or computing system 322. In some embodiments, isometric neck assessment measurements output by isometric neck assessment device 304 can be stored or additionally stored in association with a user and/or clinician profile. Further, one or more external user devices and/or computing systems can have an application 324 running thereon which can act to control and/or operate isometric neck assessment system 300 or isometric neck assessment device 304.

Having described various aspects of isometric neck assessment system(s) and/or device(s), example methods are described below for implementing the forgoing and measuring isometric neck strength of a user. Referring to FIG. 4 in light of FIGS. 1-3, a flow diagram illustrating a method 400 for measuring isometric neck strength of a user is provided, in accordance with some aspects of the present technology. The blocks of method 400 and other methods described herein can be carried out by user action, computing processes, digital conversion processes, or a combination comprising the foregoing. In some instances, blocks of method 400 and other methods described herein comprise a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

At block 410, an isometric neck assessment device or an isometric neck strength measurement device can be initiated and/or calibrated, for instance by an I/O system associated with an isometric neck assessment device and/or a computing system in communication with an isometric neck assessment/strength measurement device. Once initialized and/or calibrated, a user profile and any corresponding user data (e.g. prior assessments and/or measurements, biometric data) can be loaded into local memory of an isometric neck assessment device or another computing device in communication with the isometric neck assessment device. In some instances, initialization by a user/clinician, or computer-based program, can select an isometric neck movement that will be measured.

At block 420, one or measurements corresponding to the isometric neck strength of a user may be taken and further stored. Isometric neck strength measurements can be taken by an isometric neck strength measurement device (e.g. 108 of FIG. 1), that is, isometric neck strength measurement device can receive an input (e.g. an input tension) corresponding to an isometric neck movement of a user. Isometric neck strength can be measured by an isometric neck strength device in the following movements corresponding to a user: cervical flexion, cervical extension, capital flexion, capital extension, left lateral flexion, right lateral flexion, left cervical rotation, and right cervical rotation. In some instances, isometric neck strength can be measured in one or more, or all of the forgoing movements, and in some other instances, isometric neck strength can be measured by a subset of the forgoing movements. For example, in some embodiments, isometric neck strength can be measured using a subset of capital flexion, cervical extension, left cervical lateral flexion, and right cervical lateral flexion. Isometric neck movements can be captured, for example using an isometric neck assessment system (e.g. 100 of FIG. 1). Various inputs can be received by isometric neck strength measurement device utilizing various attachment points on a head harness/strap and a patient performing isometric neck movements.

In some examples, capital flexion and cervical extension movements can be performed by a user in a tandem stance, with feet shoulder width apart, and arms crossed over the chest. In some other examples, left and right cervical lateral flexion can be performed with the user's feet shoulder width apart. Additionally, these measurements can be taken while the user is in a seated position or standing position. The head strap and/or headgear if the isometric neck strength assessment system (e.g. 104 of FIG. 1) can be secured tightly to the head and/or chin of the user. Each isometric contraction in a given measurement setup can be held for a determined amount of time and/or for a determined number of repetitions, for example held for three seconds and repeated three times per movement. The isometric neck assessment device can subsequently display a numerical value after each contraction which represents the maximal force the user could produce per contraction (e.g. which can be measured in kilograms). In some other embodiments, the isomeric neck assessment device can perform any number of functions or transformative functions on the received measurement data, for example averaging any number of registered measurements and/or determining a peak measurement.

At block 430, based on received input corresponding to an isometric neck movement of a user, the isometric neck strength measurement device and/or isometric neck assessment device can generate a tension measurement. In some embodiments, the tension measurement corresponds to a maximum contraction of the user for a given isometric neck movement. In some embodiments one or more measurements can be taken and locally stored, and the tension measurement can be an average or other statistical descriptor. In some instances, the tension measurement is displayed on a GUI of the isometric neck strength measurement device and/or isometric neck assessment device.

At block 440, a transmitting component in operable communication with the isometric neck assessment device (e.g. a Bluetooth, RFID, or NFC component) can relay measurement data (such as one or more tension measurements) to another computing device or data storage, for instance an application running on a computing device. In some instances, measurement data can be stored in association with a specified user and/or clinician profile. Additionally, in some other embodiments, other anthropometric measurements and/or other biometric of a user can be entered, stored, and/or otherwise utilized with gathered neck strength measurement data. In some even further embodiments, measurement data can be stored in association with one or more isometric neck movements that were measured, In some embodiments, the presently disclosed subject matter provides a portable isometric neck assessment system and method implementing an isometric neck strength measurement device, and further generating a health risk assessment for a user. The presently disclosed portable isometric neck assessment system provides an assessment tool to measure isometric neck strength, which can incorporate additional software components to assess, record, and process isometric neck strength data. In some instances, a software application can assess and record: isometric neck strength in two planes of movement (sagittal and frontal) through four movements (cervical flexion & extension, right & left lateral flexion). The user of the device and application can further input the following biometric data: height, weight, and neck circumference. This information can then be combined with the isometric neck strength data assessed to produce a health risk assessment for the potential to sustain a mTBI or concussion from an impact or whiplash injury. The information collected on the application is remotely stored and accessible via the user's profile.

FIG. 5 provides an illustrative operating environment for implementing embodiments of the present invention is shown and designated generally as computing device 500. Computing device 500 is merely one example of a suitable computing environment and is not intended to suggest any limitation as to the scope of use or functionality of the invention. Neither should the computing device 500 be interpreted as having any dependency or requirement relating to any one or combination of components illustrated.

Embodiments of the invention can be described in the general context of computer code or machine-useable instructions, including computer-executable instructions such as program modules, being executed by a computer or other machine (virtual or otherwise), such as a smartphone or other handheld device. Generally, program modules, or engines, including routines, programs, objects, components, data structures etc., refer to code that perform particular tasks or implement particular abstract data types. Embodiments of the invention can be practiced in a variety of system configurations, including hand-held devices, consumer electronics, general-purpose computers, more specialized computing devices, etc. Embodiments of the invention can also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. In some embodiments, devices described herein utilize wired and rechargeable batteries and power supplies. Bus 510 represents what can be one or more busses (such as an address bus, data bus or combination thereof). Although the various blocks of FIG. 5 are shown with clearly delineated lines for the sake of clarity, in reality, such delineations are not so clear and these lines can overlap. For example, one can consider a presentation component such as a display device to be an I/O component as well. Also, processors generally have memory in the form of cache. It is recognized that such is the nature of the art, and reiterate that the diagram of FIG. 5 is merely illustrative of an example computing device that can be used in connection with one or more embodiments of the present disclosure. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500, and includes both volatile and non-volatile media, removable and non-removable media. By way of example, and not limitation, computer-readable media can comprise computer storage media and communication media.

Computer storage media include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner at to encode information in the signal. By way of example, and not limitation, communication media includes wired media such as a wired network or direct-wired connection, and wireless media such as acoustic, RF, infrared, NFC, Bluetooth and other wireless media. Combinations of any of the above should also be included within the scope of computer-readable media.

Memory 512 includes computer storage media in the form of volatile and/or non-volatile memory. As depicted, memory 512 includes instructions 524, when executed by processor(s) 1014 are configured to cause the computing device to perform any of the operations described herein, in reference to the above discussed figures, or to implement any program modules described herein. The memory can be removable, non-removable, or a combination thereof. Illustrative hardware devices include solid-state memory, hard drives, optical-disc drives, etc. Computing device 500 includes one or more processors that read data from various entities such as memory 512 or I/O components 520. Presentation component(s) 516 present data indications to a user or other device. Illustrative presentation components include a display device, speaker, printing component, vibrating component, etc.

I/O ports 518 allow computing device 500 to be logically coupled to other devices including I/O components 520, some of which can be built in. Illustrative components include a microphone, joystick, game pad, satellite dish, scanner, printer, wireless device, battery, etc.

Many variations can be made to the illustrated embodiment of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing, it will be seen that this invention is one well adapted to attain all ends and objects hereinabove set forth together with the other advantages which are obvious and which are inherent to the structure. It will be understood that certain features and sub combinations are of utility and can be employed without reference to other features and sub combinations. This is contemplated by and is within the scope of the invention.

In the preceding detailed description, reference is made to the accompanying drawings which form a part hereof wherein like numerals designate like parts throughout, and in which is shown, by way of illustration, embodiments that can be practiced. It is to be understood that other embodiments can be utilized and structural or logical changes can be made without departing from the scope of the present disclosure. Therefore, the preceding detailed description is not to be taken in the limiting sense, and the scope of embodiments is defined by the appended claims and their equivalents.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules can be merged, broken into further sub-parts, and/or omitted.

The terms "a," "an," and "the" refer to "one or more" when used in this application, including the claims. Thus, for example, reference to "a subject" includes a plurality of subjects, unless the context clearly is to the contrary (e.g., a plurality of subjects), and so forth. Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

Unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Although the foregoing subject matter has been described in some detail by way of illustration and example for purposes of clarity of understanding, it will be understood by those skilled in the art that certain changes and modifications can be practiced within the scope of the appended claims. Many different arrangements of the various components and/or steps depicted and described, as well as those not shown, are possible without departing from the scope of the claims below. Embodiments of the present technology have been described with the intent to be illustrative rather than restrictive. Alternative embodiments will become apparent from reference to this disclosure. Alternative means of implementing the aforementioned can be completed without departing from the scope of the claims below. Certain features and subcombinations are of utility and can be employed without reference to other features and subcombinations and are contemplated within the scope of the claims.

The invention claimed is:

1. A portable isometric neck assessment system comprising:
a portable isometric neck strength device comprising a display component, a tension measurement component, the display component and the tension measurement component integrated into the portable isometric neck strength device, the portable isometric neck strength device further comprising one or more operation modules;
an anchor line having a first end and a second end;
a tension line having a first end and a second end; and
a wearable head harness, wherein the second end of the anchor line terminates at a junction with the isometric neck strength device, and wherein the first end of the tension line terminates at another junction with the isometric neck strength device, and a second end of the tension line is connected to the wearable head harness.

2. The portable isometric neck assessment system of claim 1, further comprising a wireless transmission component in operable communication with the tension measurement component.

3. The portable isometric neck assessment system of claim 1, wherein the first end of the anchor line is affixed to a stationary object.

4. The portable isometric neck assessment system of claim 3, wherein the first end of the anchor line is affixed to a stationary object via a loop connection mechanism.

5. The portable isometric neck assessment system of claim 2, wherein a tension measurement is communicated to a remote application or storage system.

6. The portable isometric neck assessment system of claim 1, wherein the isometric neck strength device is configured to generate a tension measurement based on a neck movement associated with a user.

7. The portable isometric neck assessment system of claim 6, wherein the tension measurement is at least one of a maximum or an average of a plurality of isometric neck movements of a user.

8. The portable isometric neck assessment system of claim 6, wherein the neck movement associated with a user is at least one of: capital flexion, cervical extension, left cervical lateral flexion, and right cervical lateral flexion.

9. The portable isometric neck assessment system of claim 5, wherein the tension measurement is stored in association with a user profile.

10. The portable isometric neck assessment system of claim 9, wherein the tension measurement is stored in association with biometric data corresponding to a user.

11. The portable isometric neck assessment system of claim 10, further comprising generating a health risk assessment for the user.

12. A method of providing an isometric neck strength assessment, the method comprising:
receiving, by an isometric neck strength device of claim 1, an input corresponding to an isometric neck movement of a user;

generating, by the isometric neck strength device, a tension measurement; and transmitting, by the isometric neck strength device, the tension measurement to an application.

13. The method of claim 12, wherein the transmitting is carried out by a wireless transmission component.

14. The method of claim 12, wherein the isometric neck movement of the user is at least one of capital flexion, cervical extension, left cervical lateral flexion, and right cervical lateral flexion.

15. The method of claim 12, wherein the tension measurement is stored in association with a user profile.

16. The method of claim 15, wherein the user profile is further associated with biometric data corresponding to the user.

17. The method of claim 12, wherein the tension measurement corresponds to a maximum contraction of the user.

18. The method of claim 12, wherein the isometric neck movement of the user is held for at least three seconds.

19. The method of claim 12, wherein the tension measurement is at least one of a maximum or an average of a plurality of individual inputs corresponding to an isometric neck movement of a user.

20. The method of claim 16, further comprising determining a health risk assessment for the user.

* * * * *